US012286319B2

(12) United States Patent
Campedelli et al.

(10) Patent No.: US 12,286,319 B2
(45) Date of Patent: Apr. 29, 2025

(54) JOINING APPARATUS FOR SUPPORTING STRIPS OF ADHESIVE LABELS AND A JOINING PROCESS FOR SUPPORTING STRIPS OF ADHESIVE LABELS

(71) Applicant: MAKRO LABELLING S.R.L., Goito (IT)

(72) Inventors: Davide Campedelli, Goito (IT); Marco Bellini, Goito (IT)

(73) Assignee: MAKRO LABELLING S.R.L., Goito (IT)

( * ) Notice: Subject to any disclaimer, the term of this patent is extended or adjusted under 35 U.S.C. 154(b) by 428 days.

(21) Appl. No.: 17/755,081

(22) PCT Filed: Oct. 22, 2020

(86) PCT No.: PCT/IB2020/059935

§ 371 (c)(1),
(2) Date: Apr. 20, 2022

(87) PCT Pub. No.: WO2021/079312

PCT Pub. Date: Apr. 29, 2021

(65) Prior Publication Data

US 2022/0289509 A1 Sep. 15, 2022

(30) Foreign Application Priority Data

Oct. 25, 2019 (IT) ........................ 102019000019791

(51) Int. Cl.
*B65H 19/18* (2006.01)
*B65C 9/18* (2006.01)

(52) U.S. Cl.
CPC ....... *B65H 19/1852* (2013.01); *B65C 9/1865* (2013.01); *B65H 2301/4631* (2013.01);
(Continued)

(58) Field of Classification Search
CPC ........ B65H 19/1852; B65H 2301/4631; B65H 2402/10; B65H 2701/192; B65H 2801/75;
(Continued)

(56) References Cited

U.S. PATENT DOCUMENTS 2,987,108 A 6/1961 Kilmartin
2002/0046812 A1 * 4/2002 Muller ............... B65H 19/1852 156/507
2018/0186590 A1 7/2018 Pedercini et al.

FOREIGN PATENT DOCUMENTS

WO 2015/071839 A1 5/2015

OTHER PUBLICATIONS

International Search Report and Written Opinion, mailed Jan. 19, 2021, for PCT/IB2020/059935, filed Oct. 22, 2020.

* cited by examiner

*Primary Examiner* — Cynthia L Schaller
(74) *Attorney, Agent, or Firm* — Workman Nydegger

(57) ABSTRACT

A joining apparatus for supporting strips of adhesive labels comprises two modules each of which in turn comprises a conveying element of the respective supporting strip; a cutting element configured to cut a respective supporting strip; a joining element that can be configured in a first operating position, in which it keeps in position a respective supporting strip and/or a fixing element, and in a second operating position in which it abuts against the joining element of the other module so as to join the supporting strips; a locking element that can be configured between an active position and a passive position. In particular, at least one joining element can be removed from the respective module to allow the introduction of the fixing element even when the two modules are in the neared configuration to one
(Continued)

another. The subject matter of the present patent application is also a joining process for supporting strips of adhesive labels.

15 Claims, 14 Drawing Sheets

(52) U.S. Cl.
CPC .... *B65H 2402/10* (2013.01); *B65H 2701/192* (2013.01); *B65H 2801/75* (2013.01)

(58) Field of Classification Search
CPC .......... B65H 2301/46014; B65H 2301/46412; B65H 2407/20; B65H 19/1826; B65H 21/00; B65C 9/1865
See application file for complete search history.

JOINING APPARATUS FOR SUPPORTING STRIPS OF ADHESIVE LABELS AND A JOINING PROCESS FOR SUPPORTING STRIPS OF ADHESIVE LABELS

TECHNICAL FIELD

The present invention relates to a joining process for supporting strips of adhesive labels.

In particular, the invention relates to an apparatus that can be installed on a labelling machine and configured to join at least two supporting strips of adhesive labels with each other so as to make the processing of the labelling machine itself continuous and resistant to interruptions.

Additionally, the invention relates to a joining process for supporting strips of adhesive labels.

PRIOR ART

The installation of different types of joining apparatuses on labelling units is currently known, which are configured to join two different supporting strips of adhesive labels with one other, respectively mounted on different reels, without having to interrupt the operations of the entire work system.

For that purpose, for each labelling machine at least two reels of supporting strips are provided, so that when one reel is about to run out, the other one can be provided to be joined to the end portion of the first.

To date, as for example reported in documents US2018/0186590 and US2008/0196819, the known types of joining apparatuses use a "special" double-sided tape (classified as such in technical jargon) able to be interposed between the back of a supporting strip and the silicone-coated front of the other supporting strip or between two silicone-coated fronts of the two supporting strips. In fact, the supporting strips have a silicone-coated front surface useful for reducing the adhesion of the adhesive labels that can therefore be easily removed in order to be applied to containers.

Therefore, for that purpose, joining two supporting strips by superposition has made it necessary to use a more specific "special" double-sided tape than those on the market as it is provided with a glue that can also make the silicone-coated layer of the supporting strip stick firmly.

Furthermore, the application of the double-sided tape between the back of the strip to be joined and the silicone-coated front of the strip in advancement may be superposed with the labels with the consequent detachment of the double-sided tape itself together with the label to which it is at least partially applied, at the area of the detachment plate, thus generating the inevitable reopening of the joined strip.

SUMMARY

In this context, the technical task underlying the present invention is to provide a joining apparatus for supporting strips of adhesive labels and a joining method for supporting strips of adhesive labels which overcome the drawbacks of the above-mentioned prior art.

In particular, an object of the present invention is that of providing a joining apparatus for supporting strips of adhesive labels in which a common connection element can be used (such as common one-sided parcel tape), for making the join between two supporting strips for adhesive labels.

Another object of the present invention is that of providing a joining apparatus for supporting strips of adhesive labels configured so as to enable the application of a connection between supporting strips on the rear surfaces of both, i.e. the ones in which there are no labels.

Another object of the present invention is that of providing a joining apparatus for supporting strips of adhesive labels in which the connection element interposed between the joined supporting strips maintains a high sealing degree as it is not exposed to components external to the labelling machine that could interact directly therewith.

The stated technical task and specified objects are substantially reached by a joining apparatus for supporting strips of adhesive labels and a joining method for supporting strips of adhesive labels, which comprise the technical features disclosed in the independent claims. The dependent claims correspond to further advantageous aspects of the invention.

It should be highlighted that this summary introduces, in simplified form, a selection of concepts which will be further elaborated in the detailed description given below.

The invention is intended for a joining apparatus for supporting strips of adhesive labels conveyed by a labelling machine along a conveying direction between a respective starting reel and a collection reel. In particular, the joining apparatus comprises two modules each of which is configured to convey a respective supporting strip and both being movable with respect to one another between a distanced configuration and a neared configuration. Each of the modules comprises:

- at least one conveying element of the respective supporting strip;
- at least one cutting element arranged along the conveying direction and configured to cut a respective supporting strip at a joining zone of the same supporting strip;
- at least one joining element arranged along the conveying direction and that can be configured in a first operating position, wherein it keeps in position a joining zone of a respective supporting strip, and/or a fixing element, and in a second operating position, wherein it abuts against the joining element of the other module so as to join a first joining zone of a first supporting strip to a second joining zone of a second supporting strip;
- at least one locking element arranged along the conveying direction and that can be configured between an active position, wherein it prevents the conveying of the supporting strip, and a passive position, wherein it allows the conveying of the supporting strip.

Additionally, at least one joining element of at least one of the two modules is configured to be removable from the respective module so as to leave free, in a removed configuration, an access compartment extending through said module and transversally to the conveying direction at the modules to allow the introduction of the fixing element also when the two modules are in the neared configuration. The joining element is configured to be removable to introduce and apply the fixing element in the joining zone of both the supporting strips on a rear surface free from labels.

A joining process for supporting strips of adhesive labels conveyed by a labelling machine along a conveying direction between a respective starting reel and a collection reel, comprising the steps of:

- providing on a labelling apparatus a joining apparatus comprising two modules each of which is configured to convey a respective supporting strip and both being movable with respect to one another between a distanced configuration and a neared configuration. Furthermore, each of the two modules comprises:
  - at least one conveying element of the respective supporting strip;

at least one cutting element arranged along the conveying direction and configured to cut a respective supporting strip at a joining zone of the same supporting strip;

at least one joining element arranged along the conveying direction and that can be configured in a first operating position, wherein it keeps in position a joining zone of a respective supporting strip, and/or in a second operating position, wherein it joins a first joining zone of a first supporting strip to a second joining zone of a second supporting strip; at least one joining element of at least one of said two modules being removable from the respective module to allow the introduction of a fixing element also when the two modules are in the neared configuration;

at least one locking element arranged along the conveying direction and that can be configured between an active position, wherein it prevents the conveying of the supporting strip, and a passive position, wherein it allows the conveying of the supporting strip;

starting the conveying of a first supporting strip along the conveying direction by means of a first module of the apparatus;

arranging a second module in the distanced configuration from the first module;

arranging a joining zone of a second supporting strip at a joining element of the second module;

arranging the second module in the neared configuration with the first module;

removing the joining element from the first module during the conveying of the first supporting strip for positioning a fixing element configured to be kept in position by the same joining element;

reintroducing into position within the first module the joining element and the related fixing element;

arranging the locking elements in the active position for temporarily preventing the conveying of the first supporting strip;

activating a cutting element of the first module for performing a cut at a first joining zone of the same first supporting strip;

arranging the locking elements in the passive position for conveying the first supporting strip for a predefined stretch;

arranging the joining elements in the second operating position in order to perform the join between the two joining zones of the respective supporting strips by applying the fixing element on the respective rear surfaces of the supporting strips without adhesive labels so as to join and convey the second supporting strip along the conveying direction.

BRIEF DESCRIPTION OF THE DRAWINGS

Further characteristics and advantages of the present invention will become clearer from the indicative, and therefore non-limiting, description of a preferred but not exclusive embodiment of a joining apparatus for supporting strips of adhesive labels, as illustrated in the attached drawings, in which.

With reference to the drawings, they serve solely to illustrate embodiments of the invention with the aim of better clarifying, in combination with the description, the inventive principles on which the invention is based.

DETAILED DESCRIPTION

The present invention relates to a joining process for supporting strips of adhesive labels.

With reference to the figures, a joining apparatus for supporting strips of adhesive labels has been generically indicated with the number 1.

The other numerical references refer to technical features of the invention which, barring indications otherwise or evident structural incompatibilities, the person skilled in the art will know how to apply to all the variant embodiments described.

Any modifications or variants which, in the light of the description, are evident to the person skilled in the art, must be considered to fall within the scope of protection established by the present invention, according to considerations of technical equivalence.

FIGS. 1-6 illustrate a joining apparatus 1 for supporting strips 2*a*, 2*b* of adhesive labels 3 conveyed by a labelling machine along a conveying direction C between a respective starting reel 4*a*, 4*b* and at least one collection reel. In particular, the joining apparatus 1 comprises two modules 5*a*, 5*b* that can be moved with respect to one another between a distanced configuration and a neared configuration (FIG. 2 and FIG. 4) and each of which is configured to convey a respective supporting strip 2*a*, 2*b* along the conveying direction C.

The neared configuration of the modules 5*a*, 5*b* envisages that the modules are preferably abutted to one another.

In more detail, each of such modules 5*a*, 5*b* comprises at least one conveying element 6 of the respective supporting strip 2*a*, 2*b*, at least one cutting element 7*a*, 7*b*, at least one joining element 8*b*, 8*b* and at least one locking element 9*a*, 9*b*.

The conveying element 6 comprises at least one roller (rotating idly or controlled by a motor) useful for making the respective supporting strip 2*a*, 2*b* advance correctly along the conveying direction C between the starting reel 4*a*, 4*b* and the collection reel.

Figure 1:
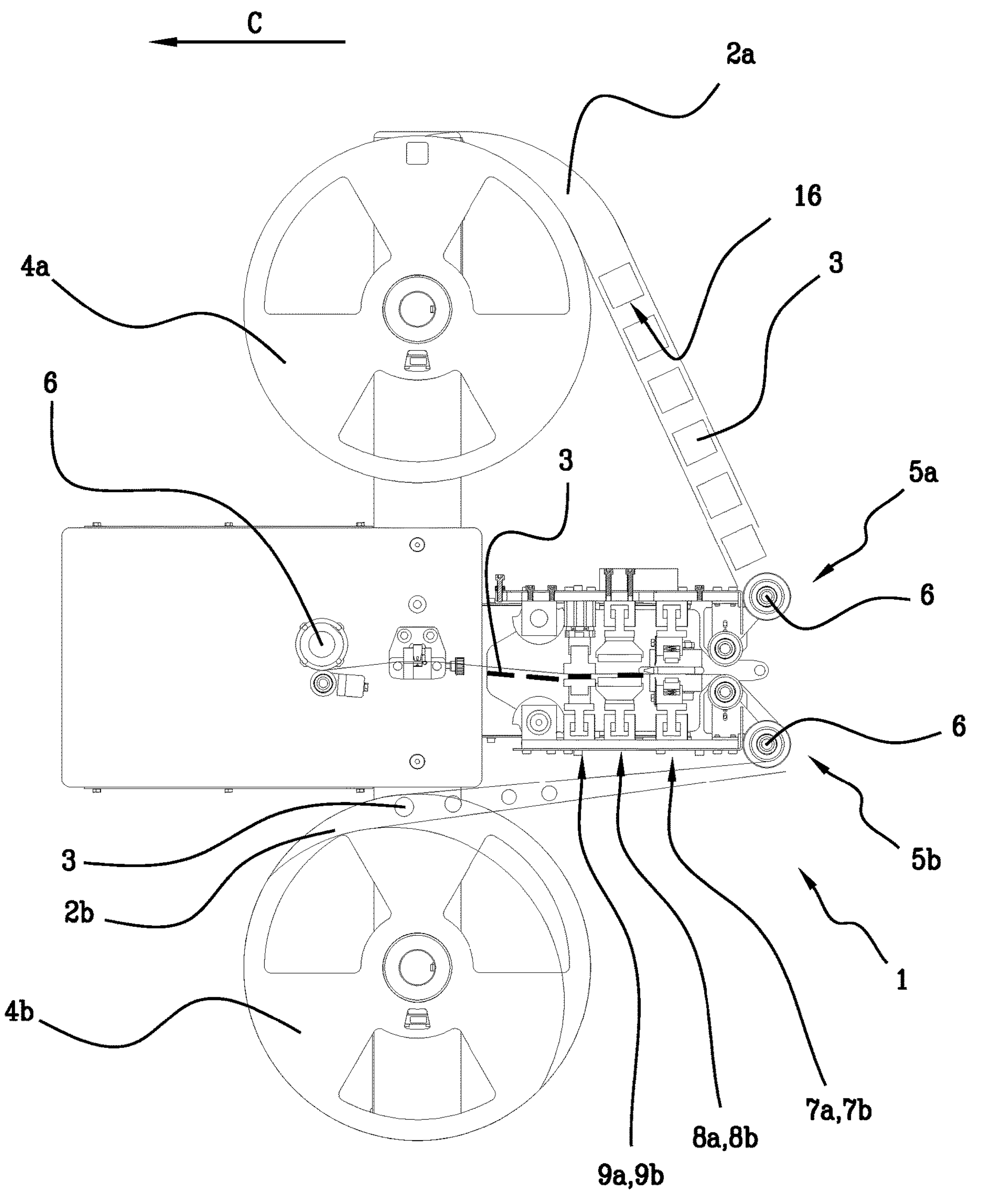
FIGS. 1-6 illustrate a lateral view and with some parts in a section view, of a portion of a labelling machine in which a joining apparatus for supporting strips of adhesive labels is installed, arranged according to different work configurations.
Figure 2:
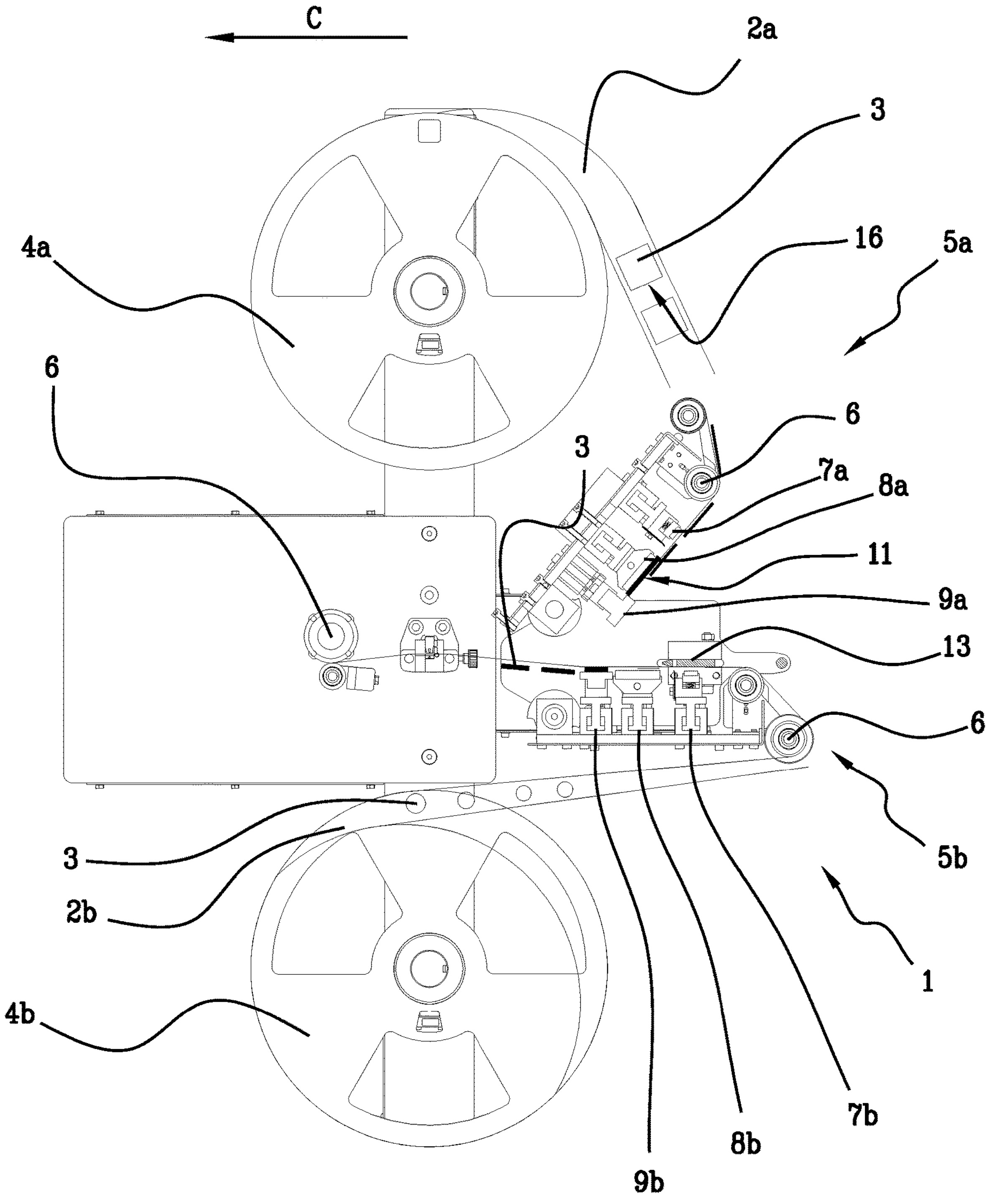
Figure 3:
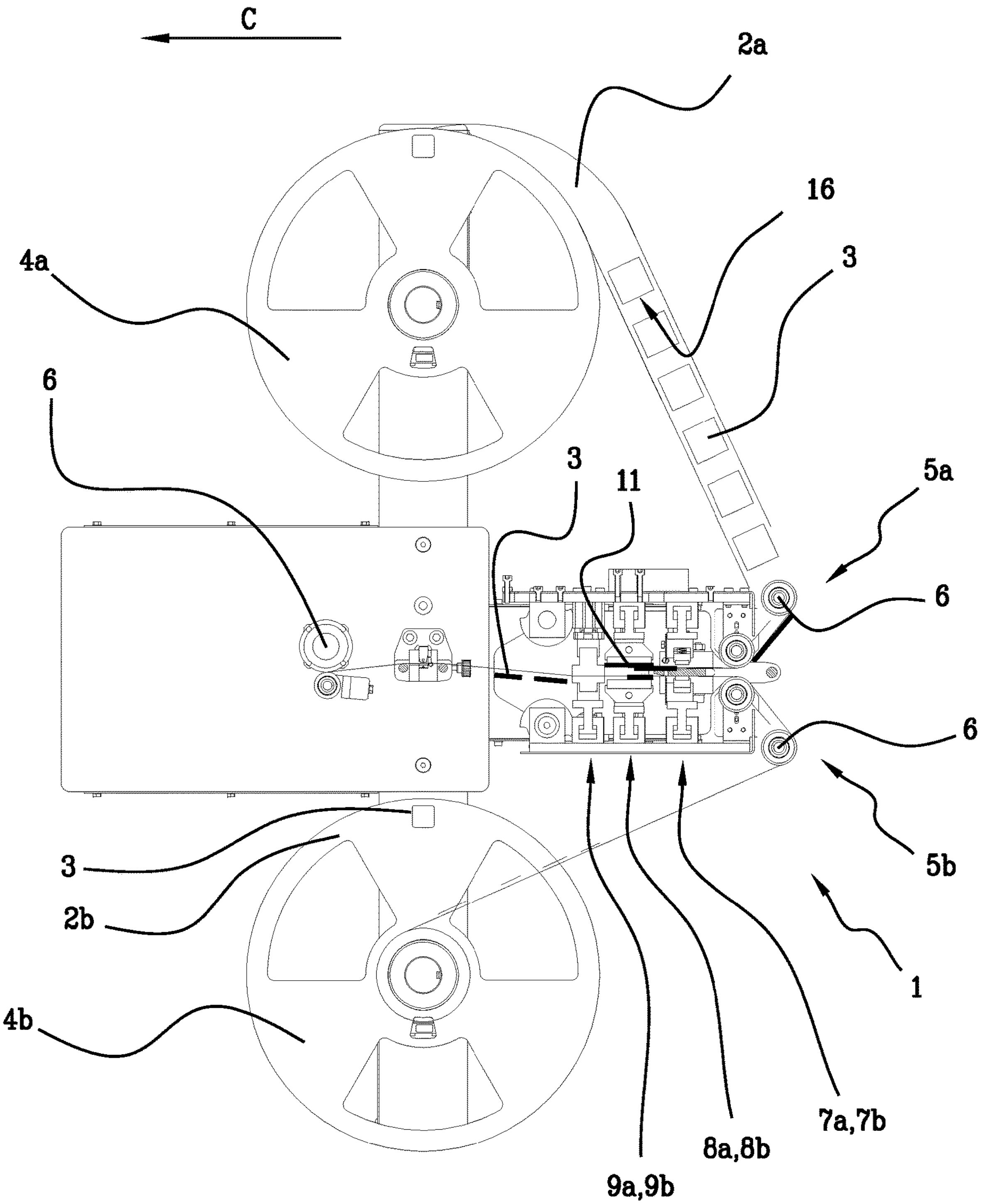
Figure 4:
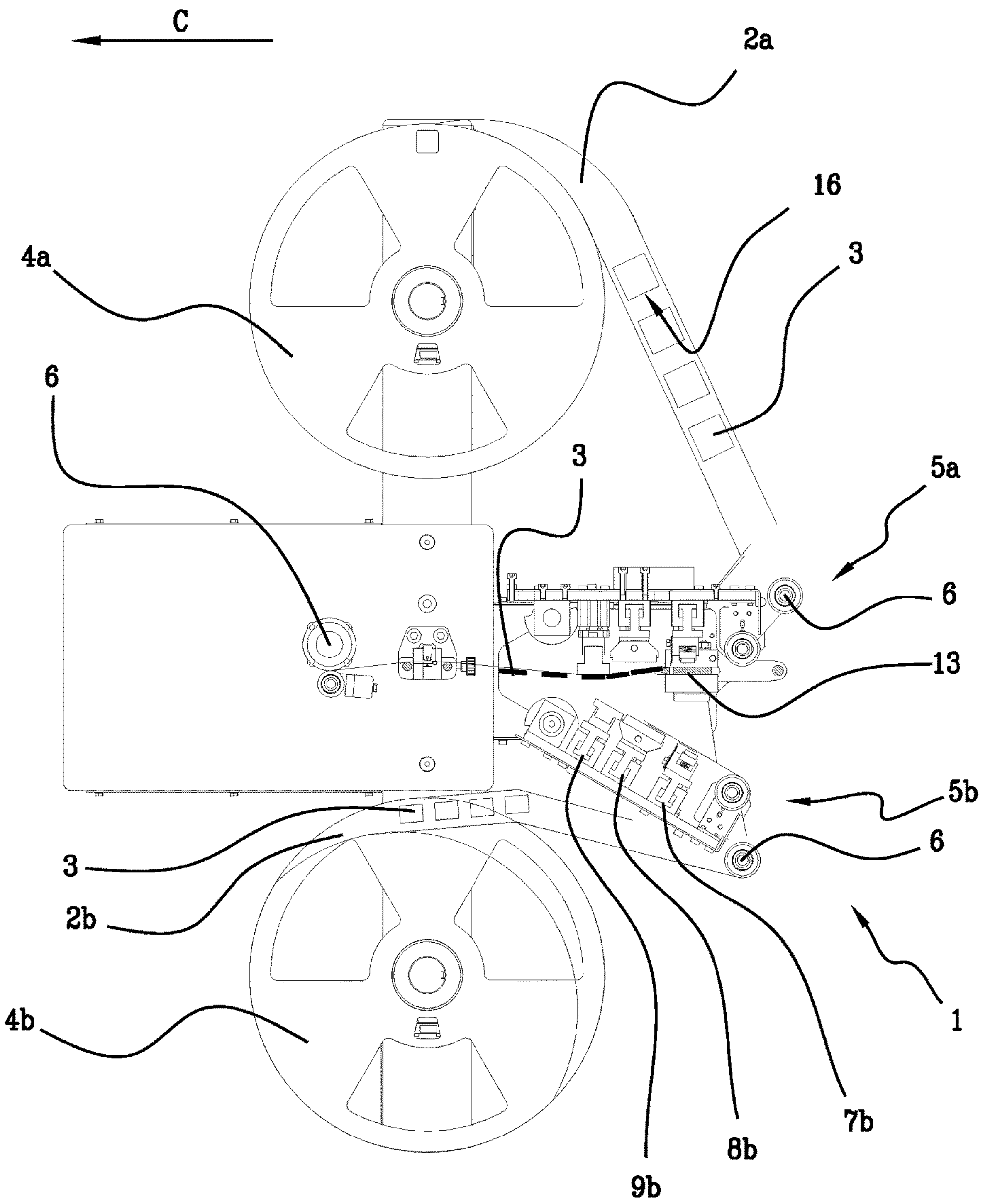

The cutting element 7*a*, 7*b* is arranged along the conveying direction C and is configured to cut a respective supporting strip 2*a*, 2*b* at a joining zone 10*a*, 10*b* of the same supporting strip 2*a*, 2*b* (FIG. 3, cut by the lower cutting element 7*b*).

The joining element 8*b*, 8*b* is arranged along the conveying direction C and can be configured in a first operating position, wherein it keeps in position a joining zone 10*a*, 10*b* of a respective supporting strip 2*a*, 2*b*, and/or a fixing element 11, and in a second operating position, wherein it abuts against the joining element 8*b*, 8*b* of the other module

Figure 6:
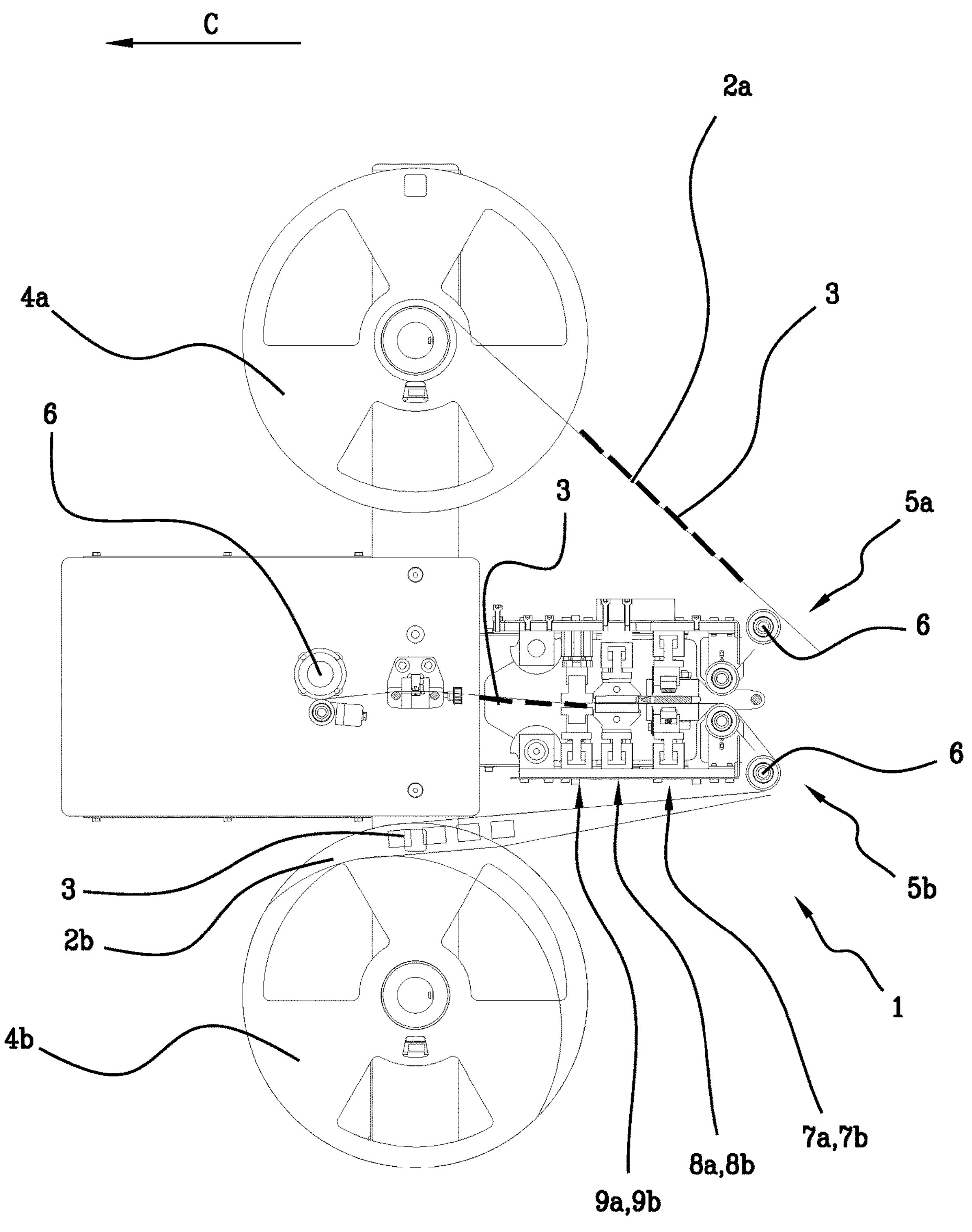

5*a*, 5*b* so as to join a first joining zone 10*a* of a first supporting strip 2*a* to a second joining zone 10*b* of a second supporting strip 2*b* (FIG. 6).

By way of example, the fixing element 11 can be a portion of single-sided tape.

The locking element 9*a*, 9*b* is arranged along the conveying direction C and can be configured between an active position (FIG. 3), wherein it prevents the conveying of the supporting strip 2*a*, 2*b*, and a passive position (FIG. 1), wherein it allows the conveying of the supporting strip 2*a*, 2*b* along the conveying direction C.

Figure 5:
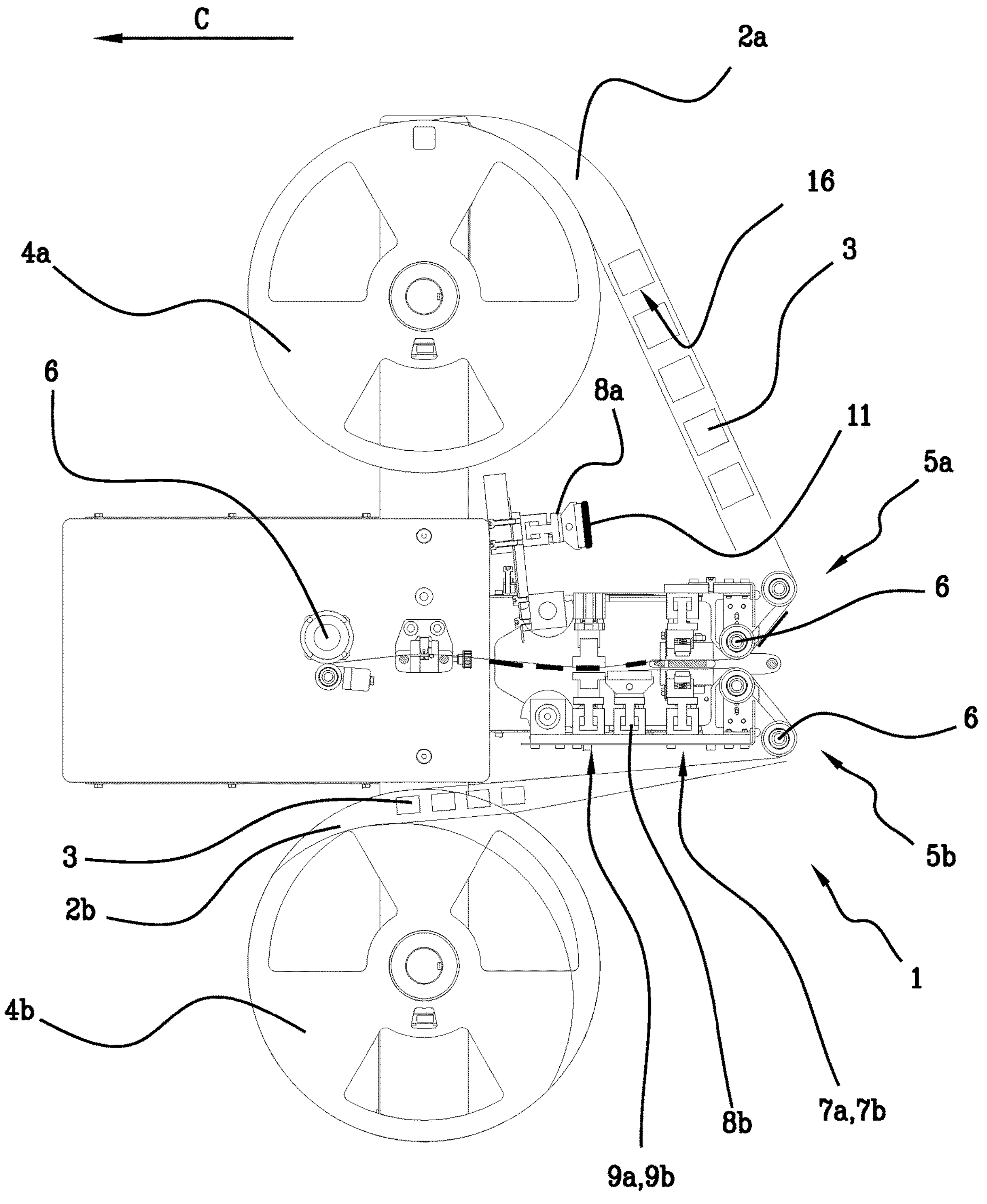

Advantageously, at least one joining element 8*b*, 8*b* of one of the two modules 5*a*, 5*b* is configured to be removable from the respective module 5*a*, 5*b* so as to leave free, in a removed configuration, an access compartment extending through said module 5*a*, 5*b* and transversally to the conveying direction C at the modules 5*a*, 5*b* to allow the introduction of the fixing element 11 also when the two modules 5*a*, 5*b* are in the neared configuration (FIG. 5). The joining element 8*b*, 8*b* is configured to be removable to introduce and apply the fixing element 11 in the joining zone 10*a*, 10*b* of both the supporting strips 2*a*, 2*b* on a rear surface 12 free from labels 3.

In other words, at least one of the modules 5*a*, 5*b* comprises an access compartment configured to make the supporting strips 2*a*, 2*b* directly accessible to an operator (the compartment places in communication the supporting strips 2*a*, 2*b* with the outside) to which the fixing element 11 must be applied when the joining element 8*b*, 8*b* is in the removed configuration. Consequently, when the joining element 8*b*, 8*b* is in a condition inserted into the respective module 5*a*, 5*b*, the same joining element 8*b*, 8*b* is positioned at the access compartment, occupying it, so as to be able to be configured between the first and the second operating position so as to perform the join of the supporting strips 2*a*, 2*b*.

In this way, an operator is advantageously able to apply the fixing element 11 directly to the supporting strips 2*a*, 2*b* without having to remove components of the apparatus, e.g. of the retaining portions for the fixing element, to then be reinstalled at a later time within the apparatus for being able to perform the join of the same supporting strips.

Preferably, the supporting strips 2*a*, 2*b* comprise a rear surface 12 on which a fixing element 11 can be easily applied and a front silicone-coated surface on which the adhesive labels 3 are arranged. In the figures, the front silicone-coated surface of the supporting strips 2*a*, 2*b* is turned downwards when they are made to advance along the conveying direction C.

According to a first embodiment of the invention illustrated in FIG. 5 (and likewise also in FIG. 8*c*), the joining element 8*a* of the module 5*a* is rotatably connected to the rest of the module 5*a* so as to be able to be removed by rotation.

In particular, the apparatus 1 comprises a box-shaped body that encloses it. Such box-shaped body preferably comprises a portion that can be opened through a door that can be moved thanks to a rotating hinge. Advantageously, the joining element 8*a* of the module 5*a* is connected to such door and, therefore, can be removed from the module 5*a* so as to leave an access compartment free through which an operator can insert the fixing element 11.

Otherwise, as better described below, the fixing element 11 can be positioned (more simply for the operator) directly on the joining element 8*a* which, once reinserted into the module 5*a*, can position the fixing element 11 correctly facing the joining zones 10*a*, 10*b* of the supporting strips 2*a*, 2*b*, and more precisely towards their rear surfaces 12 free from adhesive labels 3.

Alternatively, different embodiments of the invention (not illustrated) envisage that the joining element 8*a* of the module 5*a* is slidably connected to the rest of the module 5*a* so as to be able to be removed by sliding.

In particular, at least one joining element 8*b*, 8*b* of the respective module 5*a*, 5*b* can be arranged inside a drawer sliding internally and externally to the box-shaped body which delimits the apparatus 1 so as to make an access compartment available for the insertion of a fixing element 11. Such drawer can be designed to be slidable according to any sliding direction such as, for example, a direction orthogonal to the conveying direction C (sliding upwards with reference to the figures) or parallel to the latter (sliding laterally with reference to the figures).

In other embodiments not illustrated, the joining element 8*a* of the module 5*a* can be removed from the rest of the module 5*a* in other ways not expressly indicated herein.

According to an aspect of the invention, for each module 5*a*, 5*b* the respective cutting element 7*a*, 7*b*, the respective joining element 8*b*, 8*b* and the respective locking element 9*a*, 9*b* are arranged consecutively to one another along the conveying direction C so that the locking element 9*a*, 9*b* is arranged downstream of the joining element 8*b*, 8*b* whereas the cutting element 7*a*, 7*b* is arranged upstream.

In this way, when the supporting strip 2*a*, 2*b* connected to the respective reel 4*a*, 4*b* is running out, it is cut by the respective cutting element 7*a*, 7*b*, the respective joining zone 10*a*, 10*b* is able to advance along the conveying direction C to come into contact with the joining elements 8*b*, 8*b* arranged consecutively to the cutting members for performing the join with the joining zone 10*a*, 10*b* of the other supporting strip 2*a*, 2*b*.

Alternatively, the positioning of the joining element 8*b*, 8*b* and of the locking element 9*a*, 9*b* can be inverted. Therefore, according to a different embodiment of the invention (not illustrated) the joining element 8*b*, 8*b* is positioned past the locking element 9*a*, 9*b* along the conveying direction C. According to an aspect of the invention, the cutting elements 7*a*, 7*b* and/or the joining elements 8*b*, 8*b* and/or the locking elements 9*a*, 9*b* are configured to be moved along a movement direction M transversal (preferably orthogonal) to the conveying direction C. In other words, when the two modules 5*a*, 5*b* are arranged in the neared configuration, the cutting elements 7*a*, 7*b*, the joining elements 8*b*, 8*b* and the locking elements 9*a*, 9*b* can be moved towards or away from one another and the movement direction M is orthogonal to the surface facing the respective supporting strip 2*a*, 2*b*. More precisely, the cutting elements 7*a*, 7*b* between one another, the joining elements 8*b*, 8*b* between one another and the locking elements 9*a*, 9*b* between one another can be moved along the movement direction M towards and away from the respective supporting strip 2*a*, 2*b* independently from the elements of the other module.

Advantageously, the joining elements 8*b*, 8*b* and the locking elements 9*a*, 9*b* of both modules 5*a*, 5*b* can be moved in a synchronous and specular way to perform the join between the supporting strips 2*a*, 2*b*.

According to an aspect of the invention, each cutting element 7*a*, 7*b* comprises a blade that extends transversally to the respective supporting strip 2*a*, 2*b* for cutting the latter at a joining zone 10*a*, 10*b* interposed between two subsequent adhesive labels 3.

In other words, the blade extends at least for a length at least equal to the width of the supporting strip 2*a*, 2*b* so that its operation along the movement direction M generates a guillotine cut on the respective supporting strip 2*a*, 2*b* at the joining zone 10*a*, 10*b* so as to chop off the supporting strip 2*a*, 2*b* into two parts in order to perform the join.

According to another aspect of the invention, the apparatus 1 comprises a spacer 13, preferably made of metal, interposed between each cutting element 7*a*, 7*b* of the two modules 5*a*, 5*b* so as to prevent cutting more than one supporting strip 2*a*, 2*b* by a single cutting element 7*a*, 7*b* when the two modules 5*a*, 5*b* are arranged in the neared configuration.

In other words, the spacer 13 is interposed between at least one conveying element 6 and the cutting elements 7*a*, 7*b* for separating the supporting strips 2*a*, 2*b* that advance along the conveying direction C.

Preferably, the spacer 13 extends along the conveying direction C beyond the orthogonal projection of the cutting elements 7*a*, 7*b*. Even more preferably, the spacer 13 has a through cavity or at least a pair of blind cavities to enable the partial insertion of the cutting elements 7*a*, 7*b* during the guillotine cut of the respective supporting strip 2*a*, 2*b*. However, in any case, the cutting members 7*a*, 7*b* are not able to project beyond the spacer 13 and, therefore, are not able to interact with the supporting strip 2*a*, 2*b* conveyed through the opposite module 5*a*, 5*b*.

According to an aspect of the invention, each joining element 8*b*, 8*b* comprises a pad configured to abut against the corresponding pad of the other module 8*b*, 8*a* and to align the joining zones 10*a*, 10*b* of the supporting strips 2*a*, 2*b* with each other so as to create the join.

Preferably, at least the portion of the pad that interacts with the supporting strip 2*a*, 2*b* is made of rubber of various types and density, e.g. silicone-coated or high density spongy materials, to avoid damaging the joining zones 10*a*, 10*b* during the joining step in which a pressing step takes place, substantially useful for sealing the fixing element 11 to one another. According to another aspect of the invention, each joining element 8*b*, 8*b* is connected to a respective suction device 14 configured to generate a suction condition able to withhold a respective joining zone 10*a*, 10*b* of a respective supporting strip 2*a*, 2*b* and/or a fixing element 11 during the movement thereof between the first and the second operating position. The suction device 14 can be integrated into the apparatus 1 or be external thereto.

The suction device 14 is configured to generate by command a suction able to withhold in position the fixing element 11 and/or the joining zone 10*a*, 10*b* of the supporting strip 2*a*, 2*b* connected to the starting reel 4*a*, 4*b* not yet used. In detail, as explained better below, the joining elements 8*b*, 8*b* have suction holes connected to the suction device 14 so as to generate a depression for withholding the fixing element 11 and/or the joining zone 10*a*, 10*b* of the supporting strip 2*a*, 2*b*.

Alternatively, the withholding of a respective joining zone 10*a*, 10*b* of a respective supporting strip 2*a*, 2*b* and/or a fixing element 11 is performed through an alternative non-suction adhesion device.

In fact, as will be explained better below in the description of the process, with reference to the figures, it can be noted how the how the arrangement of the supporting strip of the unused starting reel and of the fixing element 11 change as a function of the supporting strip that is made to advance along the conveying direction C. This different preparation derives directly from the advantageous aspect of the invention, i.e. from the possibility to always arrange the fixing element 11 on the rear side of both supporting strips 2*a*, 2*b*.

Figure 7A:
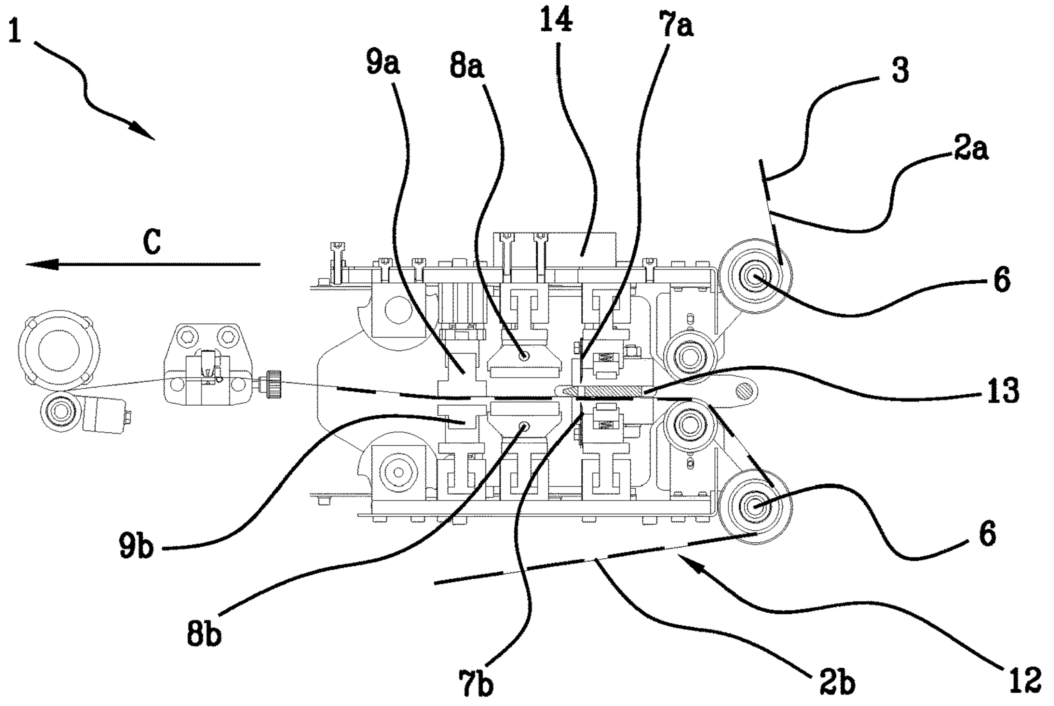
FIGS. 7*a*-7*g* illustrate a lateral view and with some parts in a section view, of a joining apparatus for supporting strips of adhesive labels that describe a first sequence of steps of a joining process performed by the apparatus itself.

When the supporting strip 2*b* (lower in the figure) is conveyed the supporting strip 2*a* (upper in the figure) is arranged on the pad of the module 5*a* (upper in the figure) together with the fixing element 11 already made to adhere to the respective joining zone 10*a* (FIG. 7*a*). In this way, the join makes the fixing element 11 which has already been made to adhere to the upper supporting strip 2*a* adhere from above onto the joining zone 10*b* of the supporting strip 2*b* chopped off by the cutting element 7*b*.

Figure 8A:
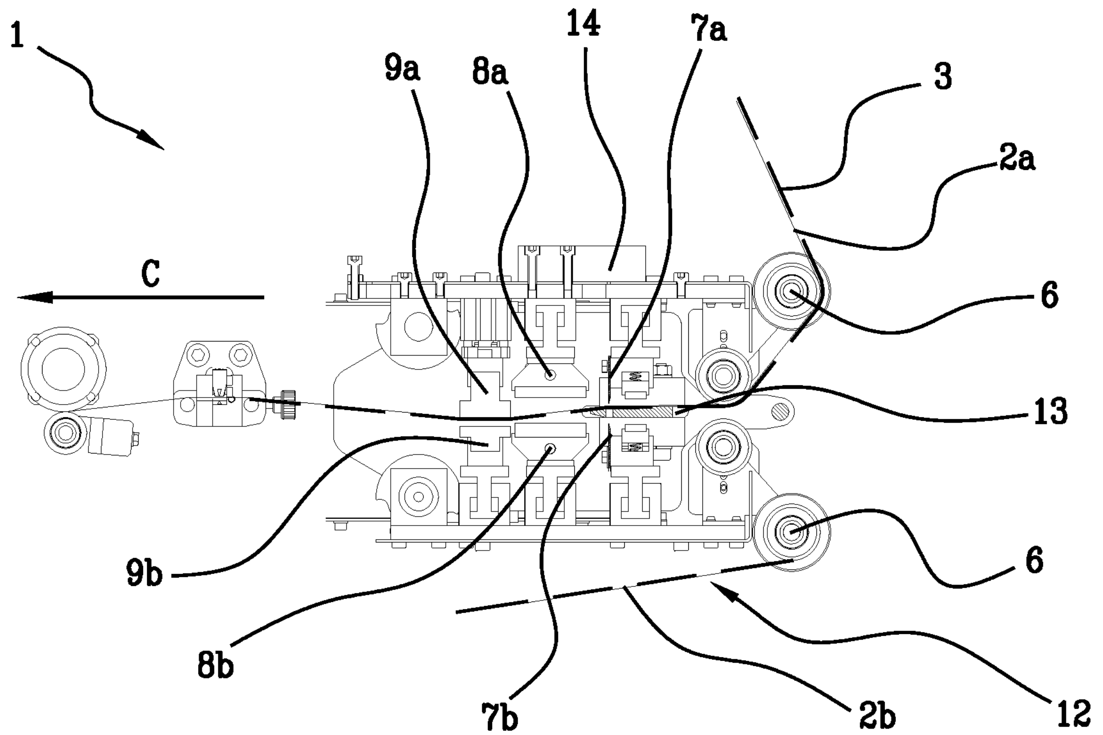
FIGS. 8*a*-8*h* illustrate a lateral view and with some parts in a section view, of a joining apparatus for supporting strips of adhesive labels that describe a second sequence of steps of a joining process performed by the apparatus itself.
Figure 8B:
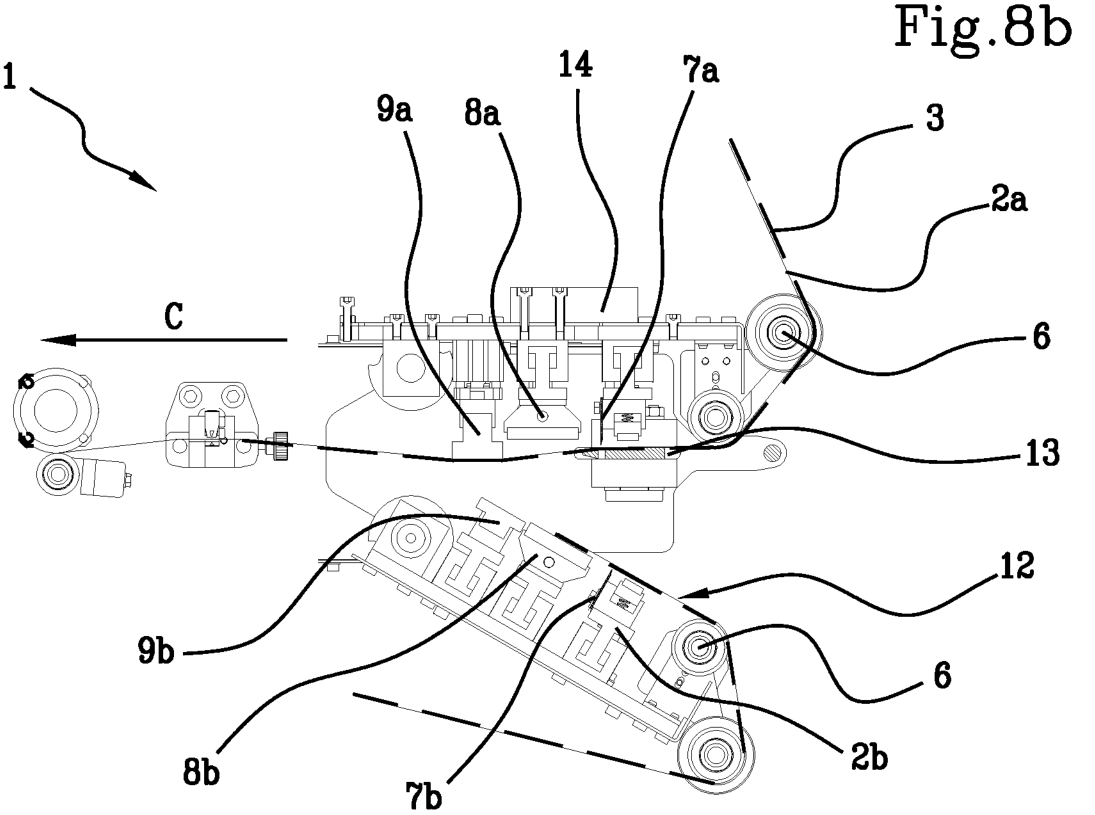
Figure 8C:
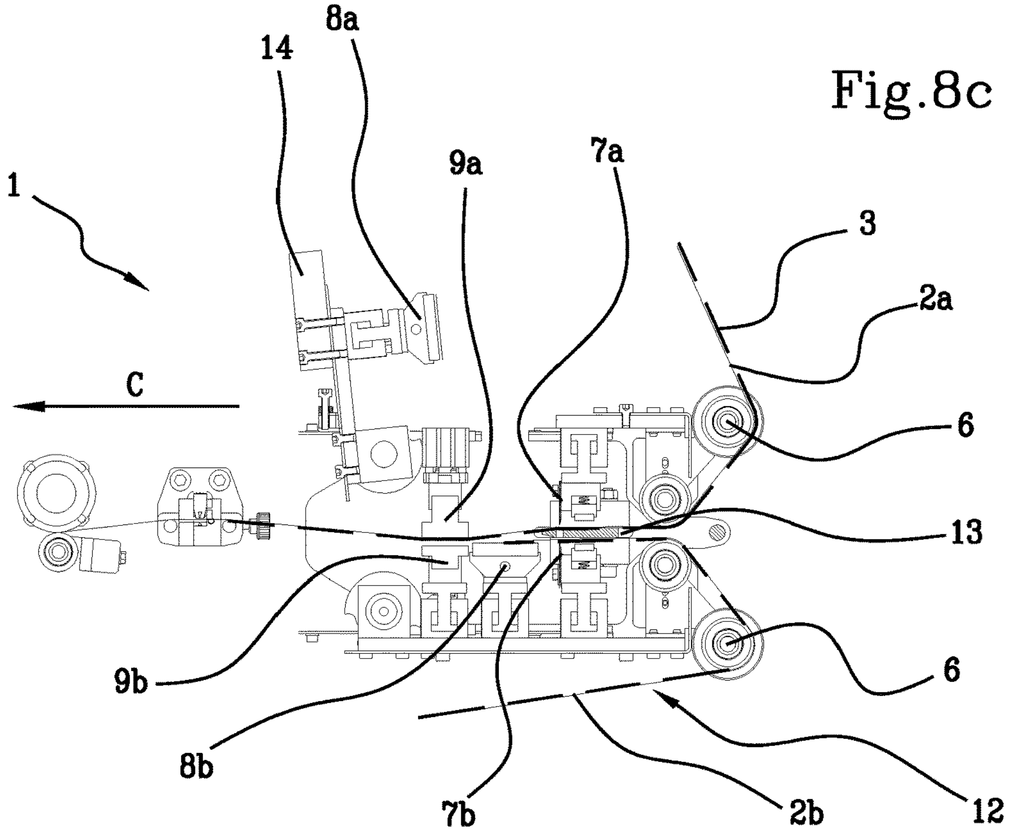

Otherwise, when the supporting strip 2*a* (upper in the figure) is conveyed, only the supporting strip 2*b* (lower in the figure) is arranged at the pad of the module 5*b* (lower in the figure), whereas the fixing element 11 is arranged at the pad of the upper module 5*a* (FIG. 8*b* and FIG. 8*c*). In fact, advantageously, such upper pad can be removed from the respective module 5*a* also during the conveying of the supporting strip 2*a*.

In this way, the join makes the fixing element 11 to adhere from above to the joining zone 10*a* of the supporting strip 2*a* chopped off by the cutting element 7*a* and the joining zone 10*b* of the supporting strip 2*b* previously arranged in position.

According to a further aspect of the invention, the pad comprises an active surface 15*a*, 15*b* perforated to allow the suction of air and withhold the joining zone 10*a*, 10*b* of the respective supporting strip 2*a*, 2*b*.

In other words, the suction device 14 is arranged in fluid connection with the pad so that the suction condition generated causes a pull of air through the holes of the pad to keep in position (substantially for the formation of a bland vacuum or continuous suction condition) the fixing element 11 and/or the joining zones 10*a*, 10*b*.

Advantageously, the connection of the suction device 14 with the respective joining element 8*b*, 8*b* is arranged so that it does not prevent the removal of the joining element 8*b*, 8*b* from the respective module 5*a*, 5*b* to make an access compartment accessible for the positioning of the fixing element 11.

According to an aspect of the invention, each locking element 9*a*, 9*b* of each module 5*a*, 5*b* comprises a press configured to abut against a respective press of the other module 5*b*, 5*a* to hold still the supporting strip 2*a*, 2*b* when both are arranged in the active position.

Preferably, the locking elements 9*a*, 9*b* are activated to stop the advancement of the supporting strip 2*a*, 2*b* conveyed so as to allow the operation of the cutting elements 7*a*, 7*b*. Advantageously, the labelling machine comprises a compensation system, the so-called lung, which prevents the interruption of the conveying of the supporting strip 2*a*, 2*b* and therefore the application of the adhesive labels 3 to the respective containers.

According to an aspect of the invention, the apparatus 1 comprises a sensor configured to detect for each adhesive label 3 a respective front edge 16 with respect to the conveying direction C.

According to another aspect of the invention, the apparatus 1 comprises a control unit connected to the sensor and configured to calculate the distance between two successive adhesive labels 3 and, furthermore, to govern the advancement speed of the supporting strip 2*a*, 2*b*.

In other words, in the event in which the distance between two successive adhesive labels 3 is different from the nominal known one, the sensor together with the control unit is able to calculate such difference and appropriately vary the advancement speed of the supporting strip 2*a*, 2*b* along the conveying direction C to allow the adhesive label 3 to be applied correctly to the respective container. In this way, the apparatus 1 is able to compensate for any variation in distance between the consecutive adhesive labels 3 arranged on the two joining zones 10*a*, 10*b*.

With regard to an operating example of the joining apparatus 1 for supporting strips 2*a*, 2*b* of adhesive labels 3, it derives directly from what is described above which is referred to below.

FIGS. 7*a*-7*g* illustrate the sequence of steps for the arrangement at the join of the upper supporting strip 2*a*, as long as the lower supporting strip 2*b* is made to advance along the conveying direction C of the lower module 5*b*.

Such description refers to the joining apparatus 1 previously described, but can also be applied to equivalent apparatuses.

In general, a joining process for supporting strips 2*a*, 2*b* of adhesive labels 3 comprises a step of arranging a joining apparatus 1 on a labelling machine, which comprises two modules 5*a*, 5*b* that can be moved with respect to one another between a distanced configuration and a neared configuration and each of which is configured to convey a respective supporting strip 2*a*, 2*b*. Each of such modules further comprises at least one conveying element 6 of the respective supporting strip 2*a*, 2*b*; at least one cutting element 7*a*, 7*b* arranged along the conveying direction C and configured to cut a respective supporting strip 2*a*, 2*b* at a joining zone 10*a*, 10*b*; at least one joining element 8*b*, 8*b* arranged along the conveying direction C and that can be configured in a first operating position, in which it keeps in position a joining zone 10*a*, 10*b* of a respective supporting strip 2*a*, 2*b*, and/or in a second operating position, wherein it joins a first joining zone 10*a* of a first supporting strip 2*a* to a second joining zone 10*b* of a second supporting strip 2*b*; and at least one locking element 9*a*, 9*b* arranged along the conveying direction C and that can be configured between an active position, wherein it prevents the conveying of the supporting strip 2*a*, 2*b*, and a passive position, wherein it allows the conveying of the supporting strip 2*a*, 2*b*.

In particular, at least one joining element 8*b*, 8*b* of at least one of the two modules 5*a*, 5*b* can be removed from the respective module 5*a*, 5*b* to allow the introduction of a fixing element 11 even when the two modules 5*a*, 5*b* are in the neared configuration.

It is to be noted that the use of the terms "upper" and "lower" refers to the figures. However, it is to be noted that the modules 5*a* and 5*b* could be arranged vertically (having a vertical lying plane) or obliquely (having an oblique lying plane).

FIG. 7*a* illustrates the apparatus 1 when operating, wherein the modules 5*a*, 5*b* are in the abutted position to one another and the lower supporting strip 2*b* is conveyed between the respective starting reel 4*b* and the collection reel (not illustrated).

Figure 7B:
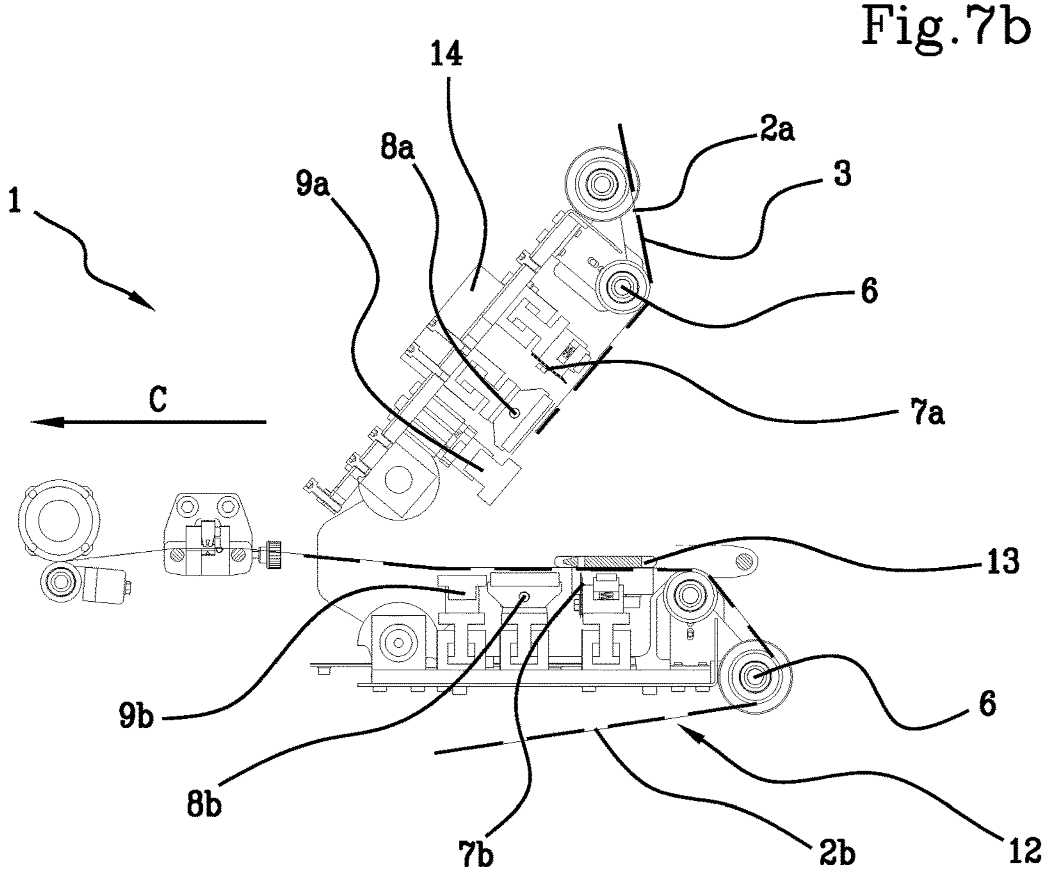

FIG. 7*b* illustrates the arrangement of the modules 5*a*, 5*b* in the distanced position, more precisely, the upper module 5*a* is raised to allow the positioning of the fixing element 11 and of the joining zone 10*a* of the upper supporting strip 2*a* (previously made to adhere to one another at the upper surface 12 free from adhesive labels 3) at the upper joining element 8*a*. In the event in which there is a suction device 14, the latter has been previously activated to generate the necessary suction condition for keeping the fixing element 11 and the upper supporting strip 2*a* in position.

Figure 7C:
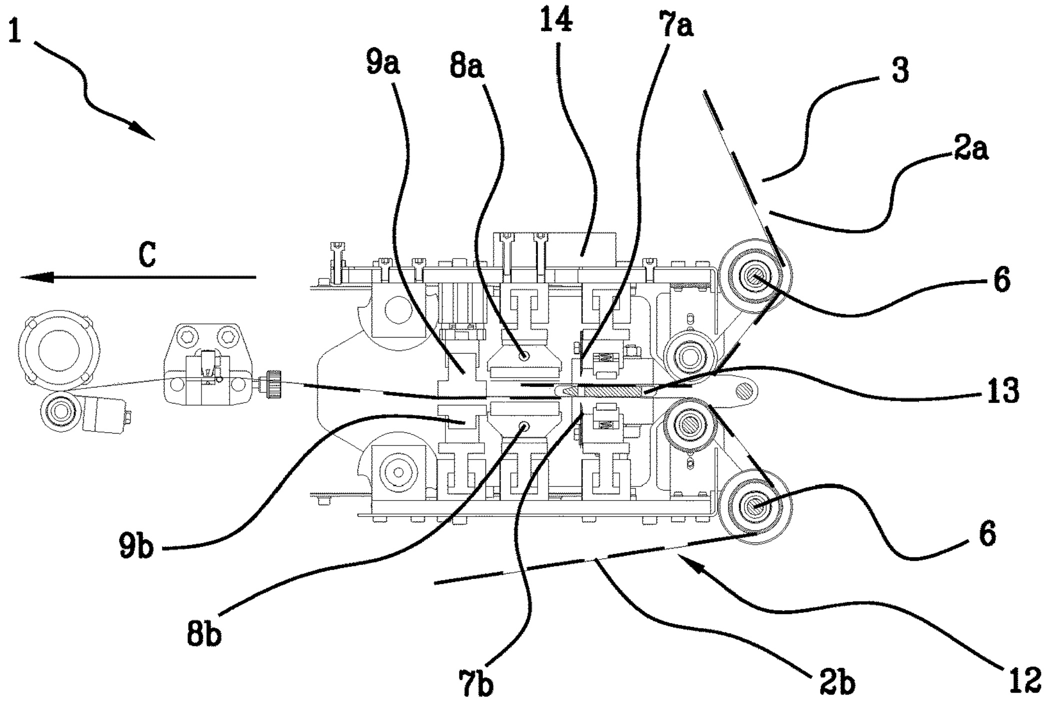

FIG. 7*c* illustrates the repositioning of the modules 5*a*, 5*b* in the abutted position and, therefore, the lowering of the upper module 5*a* towards the lower module 5*b* still operating for the conveying of the lower supporting strip 2*b*.

Figure 7D:
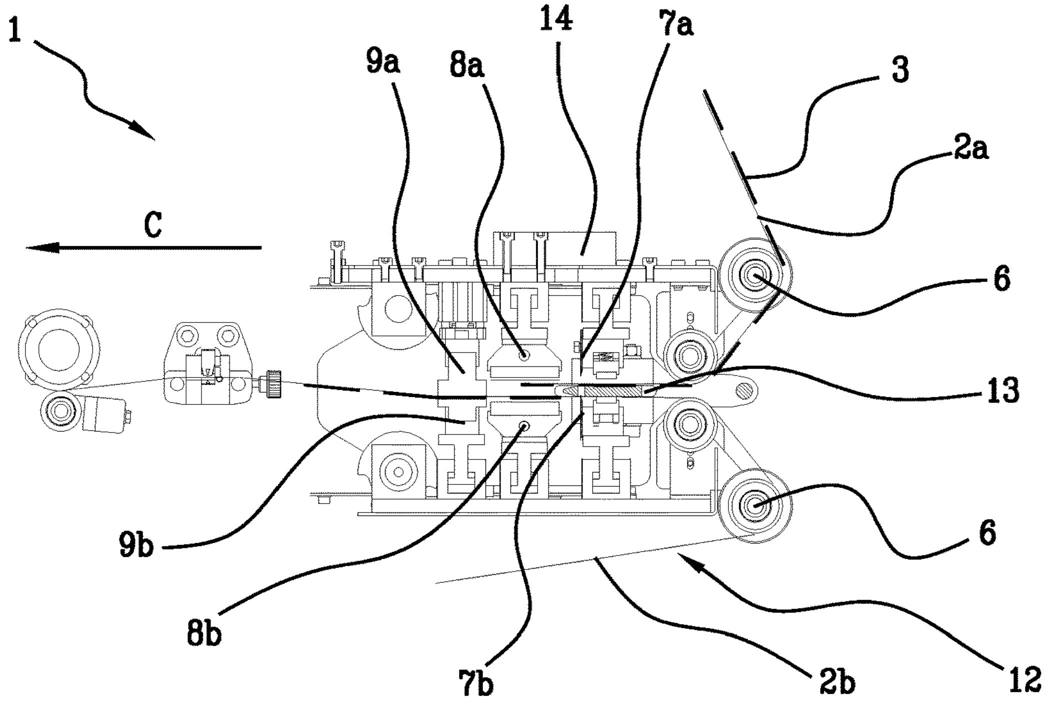

FIG. 7*d* illustrates the arrangement of the locking elements 9*a*, 9*b* in the active position for momentarily stopping the advancement of the lower strip 2*b* and the contextual activation of the lower cutting element 7*b* for chopping off the lower supporting strip 2*b* as the related starting reel 4*b* has run out.

Figure 7E:
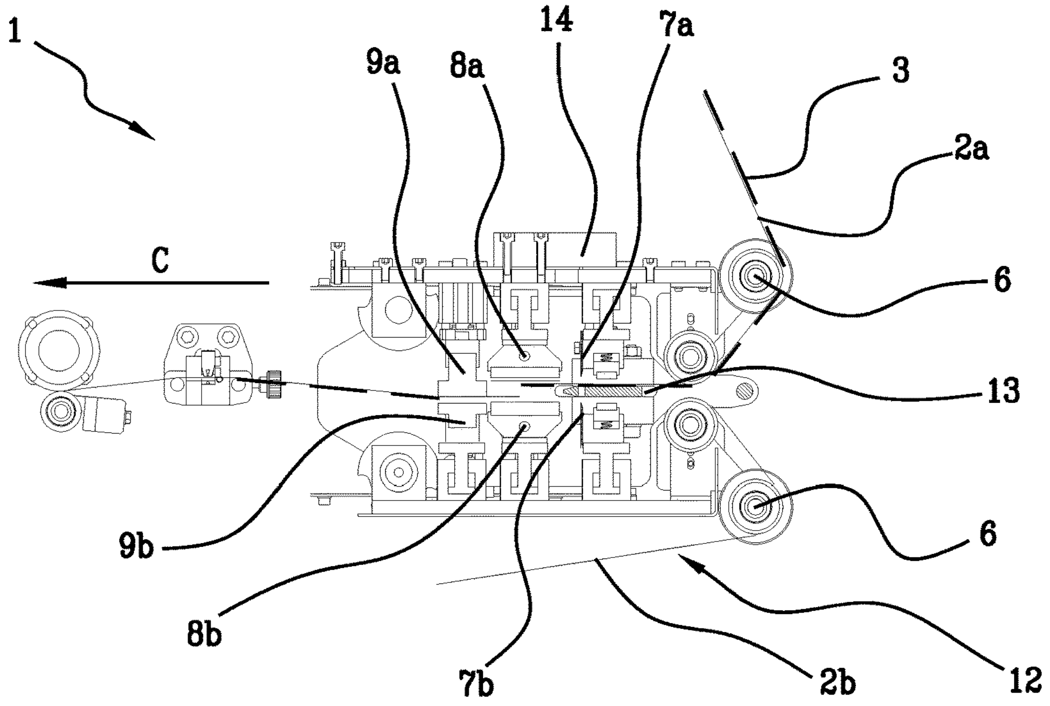

FIG. 7*e* illustrates the arrangement of the locking elements 9*a*, 9*b* in the passive position to allow a shorter partial advancement of the supporting strip 2*b* along the conveying direction C so that the related joining zone 10*b* is arranged at the joining elements 8*b*, 8*b* for the subsequent joining step.

Figure 7F:
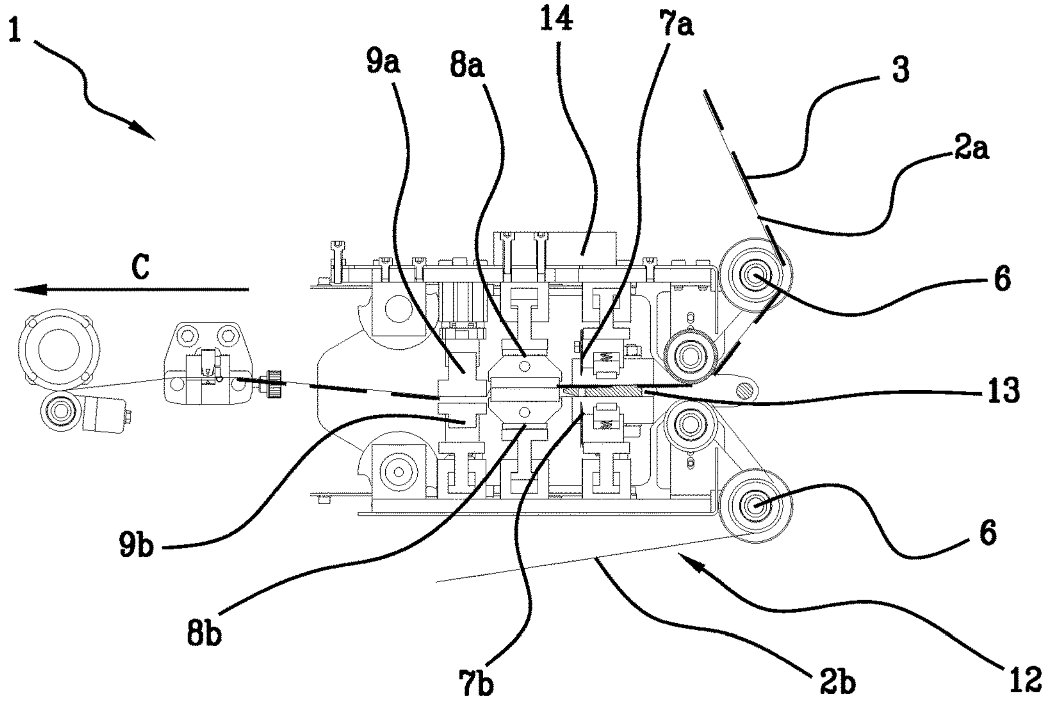

FIG. 7*f* illustrates the activation of the joining elements 8*b*, 8*b* in the second operating position for making the join between the joining zones 10*a*, 10*b* and the fixing element 11. In other words, the joining elements 8*b*, 8*b* are moved towards one another to make the fixing element 11 to adhere to the rear surface 12 of the joining zone 10*b* of the lower supporting strip 2*b*.

Figure 7G:
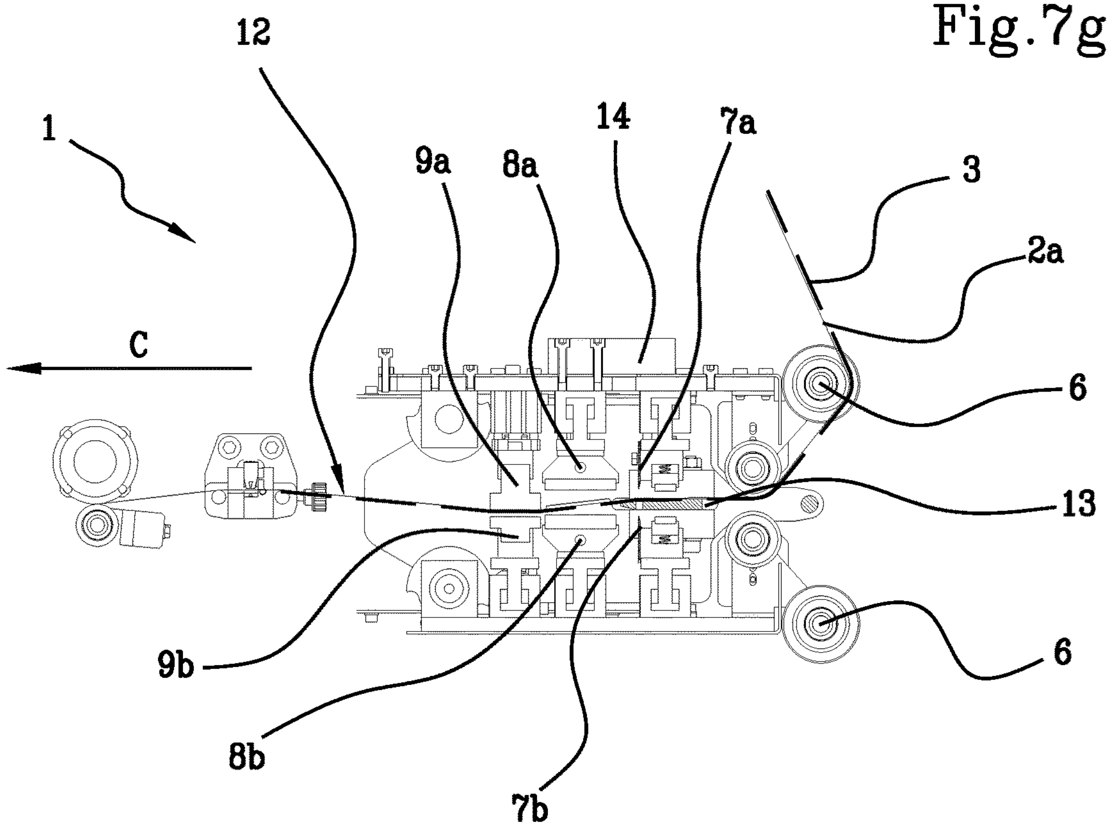

FIG. 7*g* illustrates the arrangement of the joining elements 8*b*, 8*b* in the first operating position to allow the advancement of the upper supporting strip 2*a* joined to the lower supporting strip 2*b*, while the lower starting reel 4*b* can be replaced with a full one.

Figure 7H:
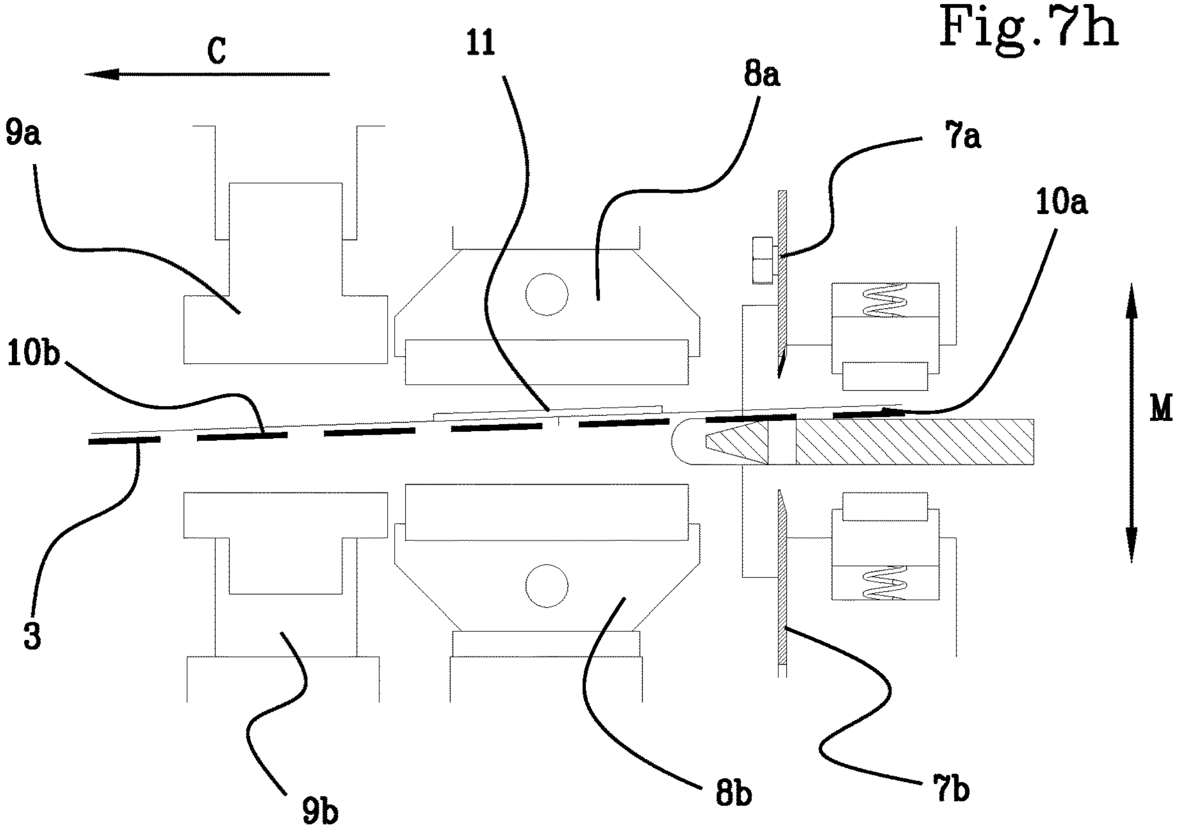
FIG. 7*h* illustrates a lateral view of an enlargement of the joining apparatus of FIG. 7*g* in which the application of the fixing element to the joining zones of the supporting strips can be seen.

Finally, FIG. 7*h* illustrates the join between the fixing element 11 and the joining zones 10*a*, 10*b* of the supporting strips 2*a*, 2*b*.

Likewise, FIGS. 8*a*-8*h* illustrate a further sequence of operating steps of a joining process for supporting strips 2*a*, 2*b* of adhesive labels 3 conveyed by a labelling machine along a conveying direction C between a respective starting reel 4*a*, 4*b* and a collection reel.

Advantageously, such steps allow the fixing element 11 to be arranged for joining the supporting strips 2*a*, 2*b* also during the operation of the labelling machine. More precisely, such steps allow the fixing element 11 to be arranged so that it adheres to the rear surface 12 free from adhesive labels 3 of both of the supporting strips 2*a*, 2*b*. With particular reference to FIGS. 8*a*-8*h*, the fixing element 11 can be arranged inside the apparatus 11 also during the advancement of the upper supporting strip 2*a*. In fact, in this case, it is obvious that the sequence of steps previously described cannot be applied. If the fixing element 11 is already made to adhere to the joining zone 10*b* of the lower supporting strip 2*b* it would then not be able to also be made to adhere to the rear surface 12 of the joining zone 10*a* of the upper supporting strip 2*a*.

Therefore, to apply the fixing element 11 to both rear surfaces 12 of the supporting strips 2*a*, 2*b*, it must be positioned from above (with reference to the appended figures).

Figure 8D:
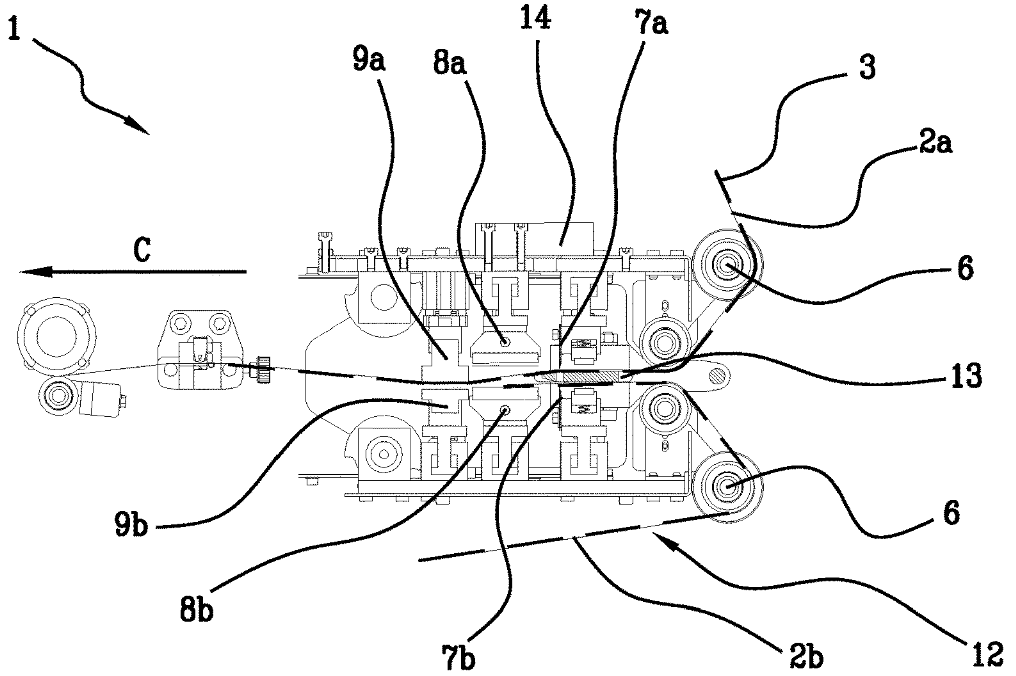
Figure 8E:
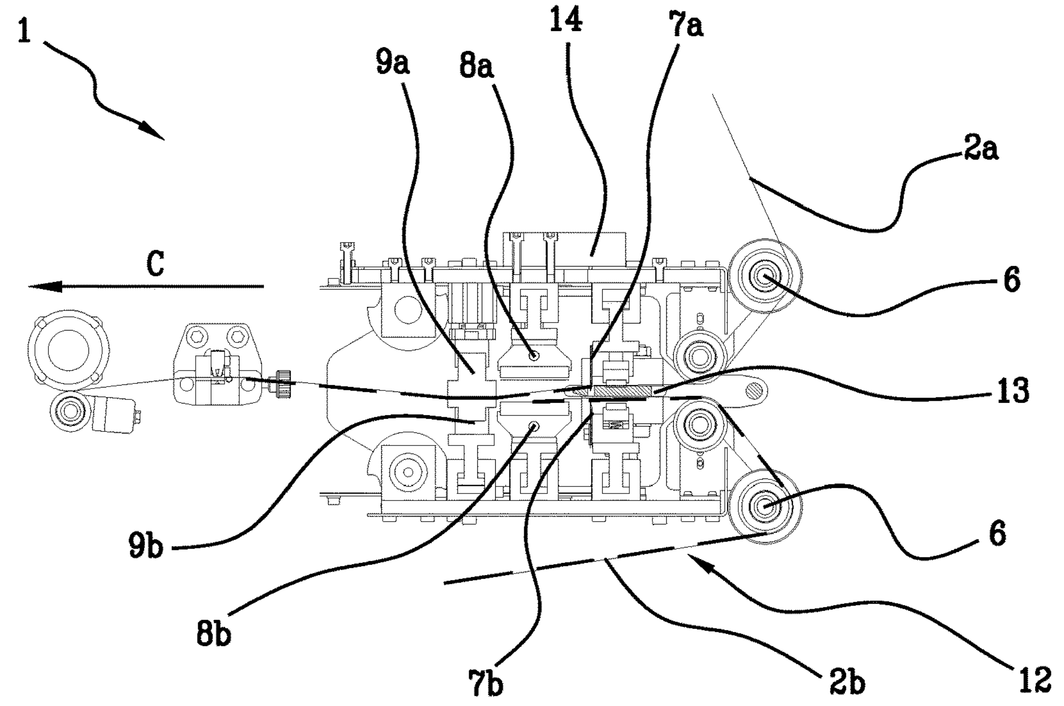
Figure 8F:
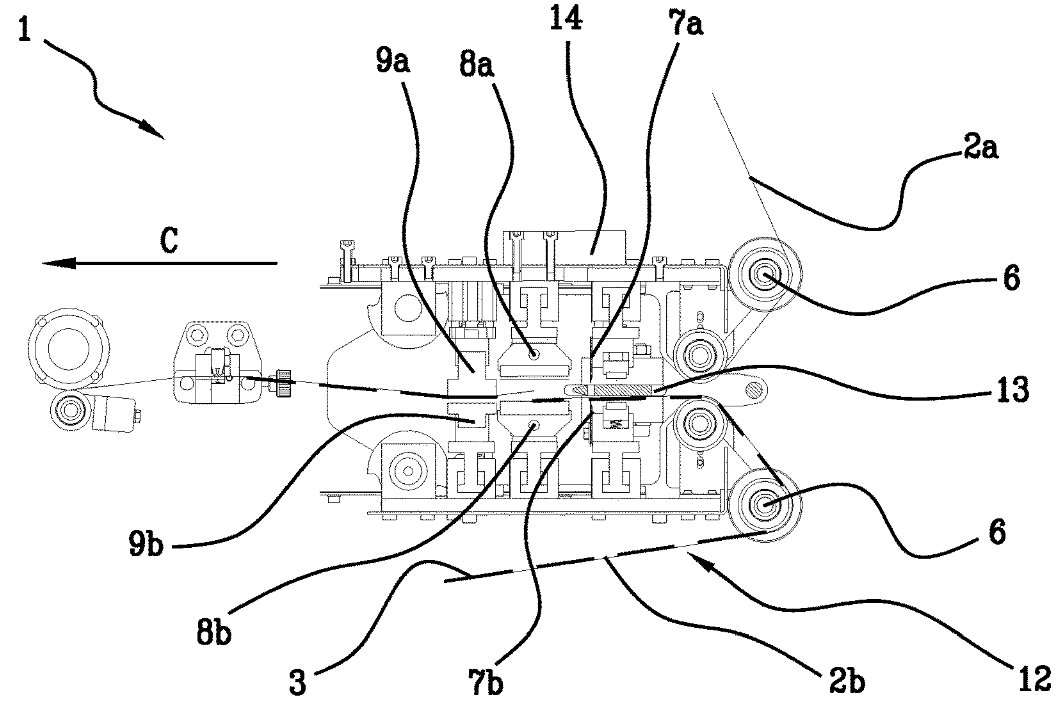
Figure 8G:
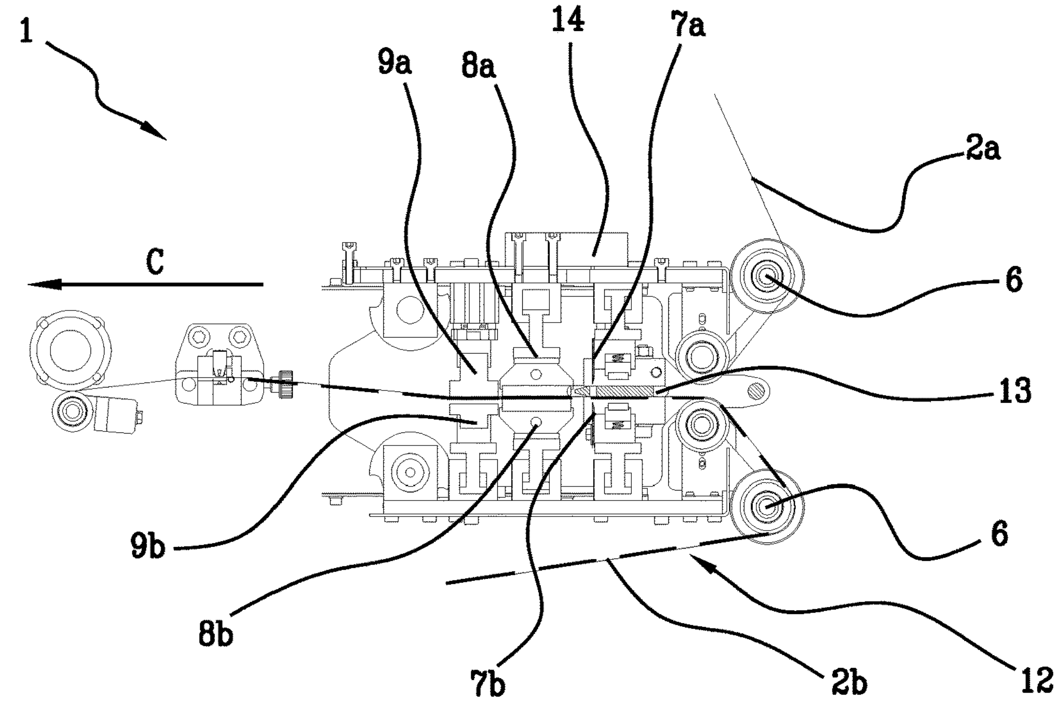
Figure 8H:
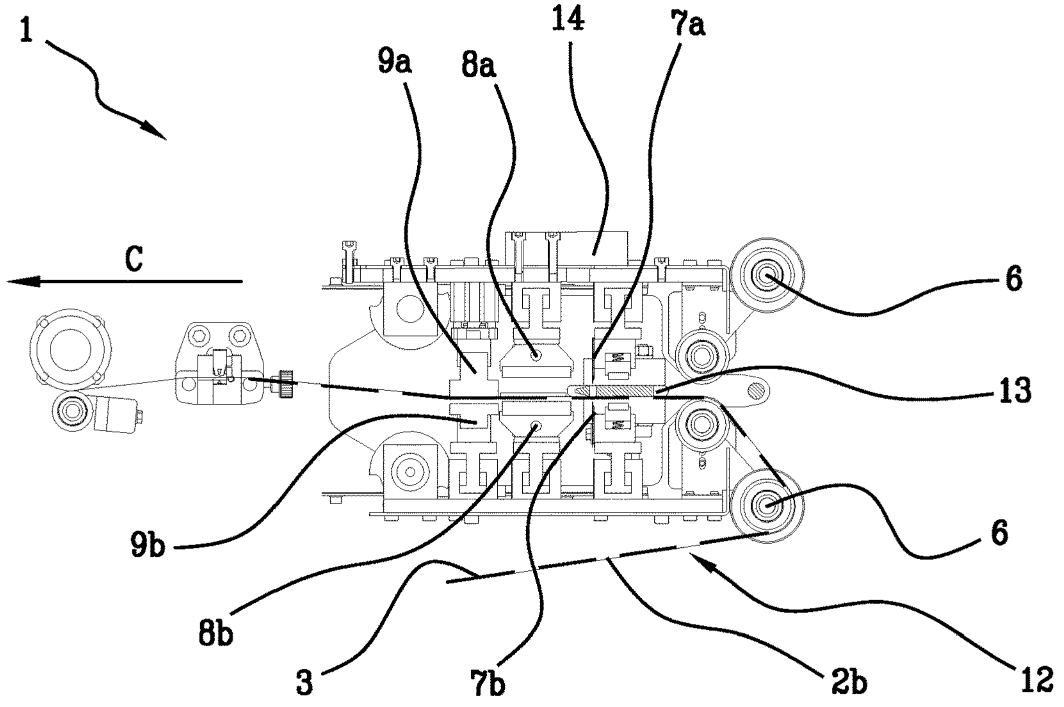

Specifically, the joining process comprises the following steps:

- starting the conveying of a first supporting strip 2*a* along the conveying direction C by means of a first module 5*a* of a joining apparatus 1 (FIG. 8*a*);
- arranging a second module 5*b* in the distanced configuration from the first module 5*a* of the joining apparatus 1 (FIG. 8*b*);
- arranging a joining zone 10*b* of a second supporting strip 2*b* at a joining element 8*b* of the second module 5*b* (FIG. 8*b*);
- arranging the second module 5*b* in the neared configuration with the first module 5*a* (FIG. 8*c*);
- removing said joining element 8*a* from said first module 5*a* during the conveying of the first supporting strip 2*a* along the conveying direction C for positioning a fixing element 11 on the same joining element 8*a* for keeping it in position (FIG. 8*c*);

reintroducing into position within the first module 5*a* the joining element 8*a* and the related fixing element 11 (FIG. 8*d*);

arranging the locking elements 9*a*, 9*b* in the active position for temporarily preventing the conveying of the first supporting strip 2*a* along the conveying direction C (FIG. 8*e*);

activating a cutting element 7*a* of the first module 5*a* for performing a cut at a first joining zone 10*a* of the same first supporting strip 2*a* (FIG. 8*e*);

arranging the locking elements 9*a*, 9*b* in the passive position for conveying the first supporting strip 2*a* for a predefined stretch (FIG. 8*f*);

arranging the joining elements 8*b*, 8*b* in the second operating position in order to perform the join between the two joining zones 10*a*, 10*b* of the respective supporting strips 2*a*, 2*b* by applying the fixing element 11 on the respective rear surfaces 12 of the supporting strips 2*a*, 2*b* free of adhesive labels 3 so as to join and convey the second supporting strip 2*b* along the conveying direction C (FIG. 8*g* and FIG. 8*h*).

According to another aspect of the invention, the joining process envisages performing first the activation of the cutting element 7*a*, 7*b* and then performing the arrangement of the joining elements 8*b*, 8*b* in the second operating position for performing the join between the two joining zones 10*a*, 10*b* of the respective supporting strips 2*a*, 2*b*.

According to a further aspect of the invention, the joining process also comprises the further steps of:

detecting for each adhesive label 3 arranged along a supporting strip 2*a*, 2*b* a front edge 16 thereof with respect to the conveying direction C;

calculating the distance that passes between two front edges 16 of two successive adhesive labels 3 so as to calculate the distance that passes between the same two successive adhesive labels 3;

adjusting the conveying speed of the supporting strip 2*a*, 2*b* as a function of the distance calculated so as to compensate for any variations in distance as a result of the join performed between the supporting strips 2*a*, 2*b* with respect to a known nominal distance.

The present invention attains the set advantages. In particular, the present invention enables the activation of a single-sided adhesive joining strip (fixing element) on a rear surface of the supporting strip of the labels reversibly both in the step from a first strip to a second strip and vice versa. In particular, the at least one removable joining element enables (once removed) the fixing element to be applied also to the back of the supporting strip of the labels that is advanced so as to be able to perform the join with the other strip (once closed again).

The invention claimed is:

1. A joining apparatus for supporting a first supporting strip and a second supporting strip of adhesive labels conveyed by a labelling machine along a conveying direction between a respective starting reel and a collection reel, said joining apparatus comprising:

a first module a second module that can be moved with respect to one other between a distanced configuration and a neared configuration, the first module being configured to convey the first supporting strip with first labels and the second module configured to convey the second supporting strip with second labels, each of said first module and said second module comprises:

at least one conveying element configured to convey the one of the first supporting strip or the second supporting strip;

at least one cutting element arranged along said conveying direction and configured to cut one of the first supporting strip at a first joining zone of the first supporting strip or the second supporting strip at a second joining zone of the second supporting strip;

at least one joining element cooperating with each of the first module and the second module, the at least one joining element being arranged along said conveying direction and that can be configured in a first operating position, wherein the at least one joining element keeps in position a joining zone of one of the first supporting strip and the second supporting strip and/or a fixing element, and in a second operating position wherein the at least one joining element of the first module abuts against the at least one joining element of the second module so as to join the first joining zone of the first supporting strip to the second joining zone of the second supporting strip;

at least one locking element arranged along said conveying direction and that can be configured between an active position, wherein the at least one locking element prevents the conveying of the first supporting strip, and a passive position, wherein the at least one locking element allows the conveying of the first supporting strip;

wherein the at least one joining element of the first modules is configured to be removable from the first module so as to leave free, in a removed configuration, an access compartment extending through the first module and transversally to the conveying direction at the first module to allow an introduction of the fixing element when the first module and the second module are in the neared configuration so as to apply said fixing element to a rear surface of at least one of the first supporting strip and the second supporting strip, in the first joining zone of the first supporting strip and second joining zone of the supporting strip, that is free from at least one of the first and second adhesive labels.

2. The joining apparatus according to claim 1, wherein said at least one cutting element, said at least one joining element and said at least one locking element of each of the first module and the second module are arranged consecutively along said conveying direction so that said at least one locking element is arranged downstream of said at least one joining element and said cutting element is arranged upstream.

3. The joining apparatus according to claim 1, wherein said at least one cutting element, said at least one joining element and said at least one locking element of each of the first module second module are configured to be moved along a transversal movement direction to said conveying direction; said movement direction being orthogonal to said conveying direction when said first module and said second module are arranged in a neared configuration so that said at least one cutting element, said at least one joining element and said at least one locking elements of said first module are movable towards or away from said at least one cutting element, said at least one joining element and said at least one locking element of said first module.

4. The joining apparatus according to according to claim 1, wherein said at least one cutting element comprises a blade extending transversally with respect to a longitudinal extension of one of said first supporting strip or said second supporting strip for cutting one of said first supporting strip or said second supporting strip at a joining zone interposed between two successive adhesive labels.

5. The joining apparatus according to according to claim 1, comprising a spacer interposed between the at least one cutting element of each of first module nd the second module when the first module and the second module are arranged in the neared configuration so as to prevent the cutting of more than one of the first supporting strip and the second supporting strip by one of the at least one cutting element.

6. The joining apparatus according to according to claim 1, wherein the at least one joining element of the first module comprises a first pad and the at least one joining element of the second module comprises a second pad, the first pad being configured to abut against the second pad to align the joining zones of the first supporting strip and the second supporting strip to create a join.

7. The joining apparatus according to according to claim 6, wherein the at least one joining element is connected to at least one suction device configured to generate a suction condition able to withhold one of the first joining zone or the second joining zone and/or the fixing element during movement between the first and the second operating position.

8. The joining apparatus according to claim 7, wherein at least one of said first pad and said second pad comprises a perforated active surface arranged in fluid communication with said at least one suction device to allow the suction of air and withhold one of the first joining zone or the second joining zone.

9. The joining apparatus according to according to claim 1, wherein the at least one locking element of the first module comprises a first press and the at least one locking element of the second module comprise a second press, the first press being configured to abut against the second press to hold still the supporting strip.

10. The joining apparatus according to according to claim 1, comprising a sensor configured to detect for each adhesive label a respective front edge with respect to the conveying direction.

11. The joining apparatus according to claim 10, comprising a control unit connected to said sensor and configured to calculate the distance between two successive adhesive labels and to govern an advancement speed of one of the first supporting strip or the second supporting strip.

12. A joining process for supporting a first supporting strip with first adhesive labels and a second supporting strip with second adhesive labels conveyed by a labelling machine along a conveying direction between a starting reel and a collection reel, comprising steps of:

arranging on a labelling machine a joining apparatus comprising a first module and a second module that can be moved with respect to one another between a distanced configuration and a neared configuration, each of the first module is configured to convey the first supporting strip comprising the first adhesive labels and the second module is configured to convey the second supporting strip comprising the second adhesive labels, each of said first module and second module comprise:

at least one conveying element configured to convey one of the first supporting strip or the second supporting strip;

at least one cutting element arranged along said conveying direction and configured to cut one of the first supporting strip or the second supporting strip at a joining zone of the one of the first supporting strip or the second supporting strip;

at least one joining element arranged along said conveying direction and that can be configured in a first operating position, wherein the at least one joining element keeps in position at least one joining zone of one of the first supporting strip or the second supporting strip, and in a second operating position, wherein the at least one joining element joins a first joining zone of the at least one joining zone of the first supporting strip to a second joining zone of the at least one joining zone of the second supporting strips at least one of the at least one joining element being removable to allow an introduction of at least one fixing element of the first module of the second module when the first module and the second modules are in the neared configuration;

at least one locking element arranged along said conveying direction and that can be configured between an active position, wherein it prevents the conveying of at least one of the first supporting strip or the second supporting strip, and a passive position, wherein it allows the conveying of at least one of the first supporting strip or the second supporting strip;

starting the conveying of the first supporting strip along said conveying direction by means of the first module of said apparatus;

arranging the second module in the distanced configuration from said first module;

arranging the second joining zone of the second supporting strip at the at least one joining element of said second module;

arranging said second module in the neared configuration with said first module;

removing the at least one joining element of the first module from said first module during the conveying of said first supporting strip for positioning a fixing element to the at least one joining element, the fixing element being configured to be kept in position by the first joining element;

reintroducing into position within said first module said at least one joining element of de first module and the related fixing element;

arranging the at least one locking element of the first module and the at least one locking element of the second module in the active position for temporarily preventing the conveying of said first supporting strip;

activating the at least one cutting element of said first module for performing a cut at the first joining zone of the first supporting strip;

arranging the at least one locking elements of the first module and the at least one locking element of the second module in the passive position for conveying said first supporting strip for a predefined stretch;

arranging the at least one joining elements in the second operating position in order to perform joining between the first joining zone of the first supporting strip and the second joining zone of the second supporting strip by applying said fixing element on a rear surface of at least one of the first supporting strip and the second supporting strip, in at least one of the first joining zone and the second joining zone, that is without adhesive labels so as to join and convey said second supporting strip along said conveying direction.

13. The process according to claim 12, wherein said step of activating the at least one cutting element is performed prior to the step of arranging said at least one joining elements in the second operating position for performing the join operation between the first joining zone and the second joining zone.

14. The process according to claim 12, comprising the further steps of:

detecting, with respect to the conveying direction, a first front edge of a first adhesive label and second front edge pf a second adhesive label, the second adhesive label being successive to the first adhesive label and being arranged along one of the first supporting strip or the second supporting stripe;

calculating a distance between the first front edge and the second front edge;

adjusting a conveying speed of the one of the first supporting strip or the second supporting strip as a function of the distance calculated so as to compensate for any distance variations as a result of the join performed between the first supporting strip and the second supporting strip with respect to a known nominal distance.

15. A joining apparatus for supporting a first supporting strip with first adhesive labels and a second supporting strip with second adhesive labels conveyed by a labelling machine along a conveying direction between a respective starting reel and a collection reel, said joining apparatus comprising:

a first module and a second module that can be moved with respect to one other between a distanced configuration and a neared configuration, the first module being configured to convey the first supporting strip with the first adhesive labels and the second module configured to convey the second supporting strip with the second adhesive labels, said first module comprises:

at least one conveying element configured to convey the first supporting strip;

a cutting element arranged along said conveying direction and configured to cut the first supporting strip at a first joining zone of the first supporting strip;

at least one joining element cooperating with each of the first module and the second module, the at least one joining element being arranged along said conveying direction and is configured to, in a first operating position, keep in position a joining zone of the first supporting strip and/or a fixing element and configured to, in a second operation position, abut the at least one joining element of the first module against that at least one joining element of the second module so as to join a first joining zone of a first supporting strip to a second joining zone of a second supporting strip;

a locking element arranged along said conveying direction is configured to prevent conveyance of the first supporting strip in an active position and is configured to allow conveyance of the first supporting strip in a passive position;

wherein the at least one joining element of the first module is configured to be removable from the first module so as to leave free, in a removed configuration, an access compartment extending through the first module and transversally to the conveying direction at the first module to allow an introduction of the fixing element when the first module and the second module are in the neared configuration.

* * * * *